United States Patent [19]

Jatnieks et al.

[11] Patent Number: 4,728,832
[45] Date of Patent: Mar. 1, 1988

[54] ALTERNATING CURRENT MOTOR WITH DIRECTIONAL ROTATION RELIABILITY

[75] Inventors: Girts U. Jatnieks, Minneapolis; Robert C. Knutson, Minnetonka; Laurence C. Rodgers, Circle Pines, all of

[73] Assignee: Honeywell Inc., Minneapolis, Minn.

[21] Appl. No.: 894,183

[22] Filed: Aug. 7, 1986

[51] Int. Cl.$^4$ .............................................. H02K 7/10
[52] U.S. Cl. ..................................... 310/41; 310/72; 310/83; 74/411; 74/421 A
[58] Field of Search ................. 310/41, 72, 68 R, 184, 310/68 B, 156, 83, 154, 161; 74/411, 421 A; 318/739, 748, 136, 754; 464/59, 160; 200/61.39, 153 V

[56] References Cited

U.S. PATENT DOCUMENTS

| | | | |
|---|---|---|---|
| 86,533 | 2/1869 | Hafner | 464/160 |
| 1,138,799 | 5/1915 | Scott | 464/160 |
| 3,200,915 | 8/1965 | Lundin | 310/41 |
| 3,209,877 | 10/1965 | Jordan | 464/160 |
| 3,347,451 | 10/1967 | Vind | 464/160 |
| 3,448,308 | 6/1969 | Pervorse et al. | 310/41 |
| 3,809,932 | 5/1974 | Erwin | 310/41 |
| 3,883,758 | 5/1975 | Lechner | 310/41 |
| 3,975,652 | 8/1976 | Hammond | 310/41 |
| 4,296,341 | 10/1981 | Guttinger | 310/41 |

FOREIGN PATENT DOCUMENTS 204596 10/1956 Australia .
2317379 10/1974 Fed. Rep. of Germany ...... 318/754

OTHER PUBLICATIONS

"Electric Motors & Electronic Motor Control Techniques"; I. M. Gottlieb; Howard W. Sams & Co. et al., Indianapolis; 1976; pp. 82–85.
Catalog Sheet for the Honeywell Modutrol Motor M644A–E, revised Apr., 1987, identified as form 60-20-38-6.

Primary Examiner—R. Skudy
Attorney, Agent, or Firm—Alfred N. Feldman

[57] ABSTRACT

A bi-directional alternating current permanent magnet motor is disclosed that is operated with a rotational restraint that insures proper directional rotation of a load. The motor output shaft is loosely coupled to a pinion gear. In the event that the motor is unable to start in the correct direction, and inadvertently reverses itself, it is immediately unloaded. This unloading causes the motor to stop and start again in the correct direction with a momentum that typically is sufficient to run the motor and its gear train in the correct direction.

4 Claims, 7 Drawing Figures

ALTERNATING CURRENT MOTOR WITH DIRECTIONAL ROTATION RELIABILITY

BACKGROUND OF THE INVENTION

In the application of electric motors to operate various types of loads, it is not uncommon to match a load to equal very closely the starting torque of the motor. If the motor is of a permanent magnet bi-directional type, it has been found that the motor sometimes will start in the wrong direction in the event that its directionally reliable starting torque is inadvertently exceeded.

Application of permanent magnet bi-directional electric motors to drive loads, such as ventilating dampers, is quite common. It is desirable to use as small a motor as possible to drive the damper. As such, a particular damper will normally be matched with a motor that has just a sufficient operating torque to correctly operate the damper. Sometimes a damper will become wedged or loaded so that the motor can not easily operate the damper in the desired direction. When this occurs the damper motor reverses its operation, thereby operating in the wrong direction. This type of operation can be very detrimental, and normally motors have been oversized in order to avoid this problem. Oversizing of motors is a rather expensive expedient.

SUMMARY OF THE INVENTION

It has been found that when certain types of motors are loaded to near or above their directionally reliable torque, the motor will start in the wrong direction. This wrong direction start, if immediately unloaded, will cause the motor to again try to start in the correct direction. Sometimes this is all that is required to operate the system correctly.

With the present system, a coupling or rotational restraint means between the motor and its output gear train is provided that allows for a momentary unloading of the motor in the event that the motor starts in a incorrect direction. A rotational restraint means that is capable of providing a lost motion is introduced inbetween the motor output shaft and the gear train for the system. In the event that a motor takes up the lost motion in the rotational restraint means, and is unable to start in the correct direction, the motor may start in the reverse direction. This immediately unloads the motor and the motor then restarts in the proper direction against the load. This restarting can allow the motor rotor sufficient rotational momentum to properly pick up the load, and to do it in the the desired or called for direction.

In accordance with the present invention there is provided a bi-directional, alternating current motor, including: permanent magnet rotor means for said motor; stator means having a pair of windings with each winding having a first end connected to a common external connection point; a capacitor having two end connections; each of said windings having a second end with said second ends connected to said capacitor end connections to form a delta connection configuration of said capacitor and said two motor windings; each of said end connections connected to further external connection points; control means for connection of said common external connection point and a first of said further external connection points to a source of alternating current potential to energize said motor to cause said rotor means to rotate in a clockwise direction; said control means for further connection of said common external connection point and a second of said further external connection points to said source of alternating current potential to energize said motor to cause said rotor means to rotate in a counterclockwise direction; said rotor means having output shaft means; output gear means rotatably mounted on said output shaft means; and rotational restraint means coupling together said output shaft means and said output gear means with said rotational restraint means allowing a limited amount of rotational freedom both clockwise and counterclockwise between said output shaft means and said output gear means.

Further there is provided in accordance with the present invention a bi-directional electric motor, including: rotor means for said motor; stator means having electrical windings and including external connection points; control means for connection of said windings to a source of electrical potential to selectively cause said rotor means to rotate in a clockwise or in a counterclockwise direction; said rotor means having output shaft means; output gear means rotatably mounted on said output shaft means; and rotational restraint means coupling together said output shaft means and said output gear means with said rotational restraint means allowing a limited amount of rotational freedom both clockwise and counterclockwise between said output shaft means and said output gear means.

DESCRIPTION OF THE PREFERRED EMBODIMENTS

Figure 1:
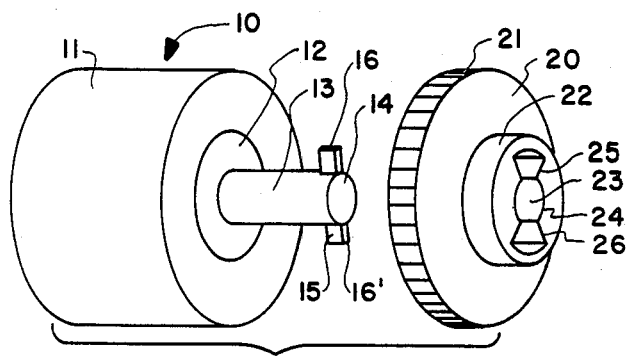
FIG. 1 is an exploded view of a motor and output gear means.
Figure 7:
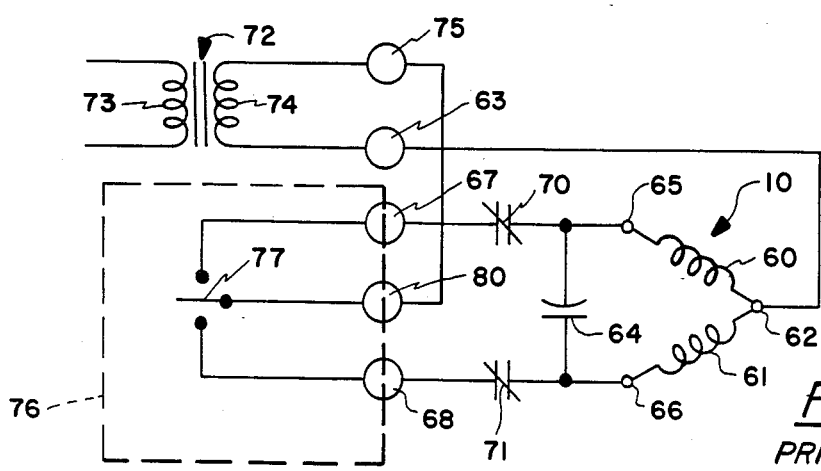
FIG. 7 is a motor schematic diagram.

In FIG. 1 there is disclosed a bi-directional, alternating current permanent magnet motor 10. This motor has a stator means 11 which includes a permanent magnet rotor means 12. The rotor means 12 has an output shaft means 13. The motor means 10 (which has winding 60 and 61 as shown in FIG. 7), the stator means 11, the rotor means 12 and the output shaft means 13 are all conventional in design. An end 14 of the shaft means 13 has a rigid member 15 mounted therethrough. The rigid member 15 could be made up of a single bar of material set into the shaft 13, or could be two projections 16 and 16'. The member 15 rotates with the output shaft means 16 of the motor 10.

Placed over the shaft means 13 is a pinion gear or output gear means 20. The output gear means 20 has appropriate teeth 21 around its perimeter, and has a collar 22 with a central opening 23. The central opening 23 allows the output gear means 20 to be placed over the output shaft means 13 and is held against movement towards and away from the motor 10 by any convenient means (not shown). The opening 23 in collar 22 is round at 24, and flared at 25 and 26. The configuration of the opening can readily be seen in FIG. 2.

Figure 2:
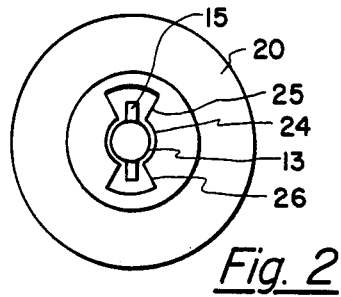
FIG. 2 is an end view of FIG. 1.

In operation, the output shaft 13 begins to rotate, for instance clockwise when viewed in FIG. 2, the member 15 has a limited amount of rotational freedom before the member 15 engages the sides of the openings 25 and 26. This allows for a lost motion or loose type of coupling, and the output gear means 20 along with the output shaft 13 and the member 15 form a rotational restraint means that couples the motor output shaft means 13 to the pinion gear 20 with freedom of rotation both clockwise and counterclockwise. Upon the motor 10 starting in the clockwise direction and finding that the load is too great to start, the motor can inadvertently reverse direction and start to rotate counterclockwise. This counterclockwise rotation immediately unloads the motor 10 by the members 15 becoming loose in the openings 25 and 26. This allows the motor 10 to restart in the clockwise or correct direction. If the motor has been properly sized, this will allow sufficient inertia to overcome the load and to allow the motor to start in the correct direction. Under no circumstance is the motor allowed to start in an incorrect direction since the unloading of the motor allows the motor control circuitry to take control of the motor and insure that it operates in the correct direction.

Figure 3:
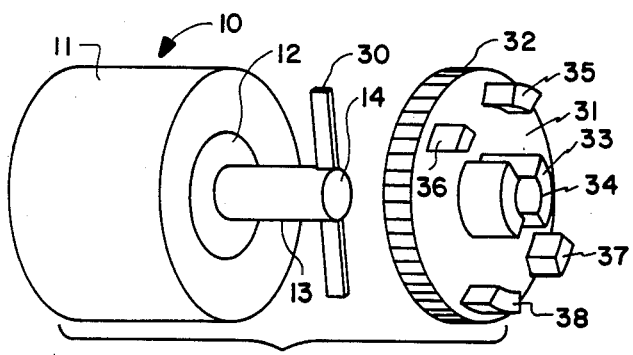
FIG. 3 is an exploded view of a further modification of FIG. 1.
Figure 4:
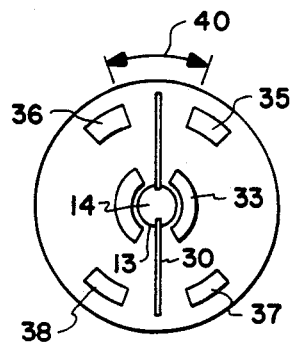
FIG. 4 is an end view of FIG. 3.

In FIGS. 3 and 4 the motor 10 with its stator 11 and its rotor 12 along with its output shaft 13 is again disclosed. In this case a flexible member 30 is disclosed as mounted into the end 14 of the output shaft means 13. Prior to fixing the flexible member 30 in place, an output gear means 31 having teeth 32 and a collar 33 is placed over the output shaft means 13. The output gear means 31 is held in place by any convenient means (not shown), but is allowed to rotate freely around the output shaft means 13 by an annular opening 34 that corresponds with the center of the output gear means 31. This can be readily seen in connection with FIG. 4.

The output gear means 31 has a plurality of projections 35, 36, 37, and 38. These projections are placed around the output gear means 31 near its periphery and define an angle 40 through which the output gear means 31 can rotate before the projections interact with the flexible member 30. Flexible member 30 provides a "soft" start through the increasing torque caused by its flexure and spring rate. With increased loading member 30 and output gear means 31 can be designed such that member 30 contacts the projections 33, 35, 36, 37, or 38 after a predetermined deflection to provide an increase in spring rate. This allows a rather large degree of freedom of rotation between the rotor output shaft means 13 and the output gear means 31 before the flexible member 30 interacts with the projections 35, 36, 37, and 38 to pick up the load associated with the pinion gear 31.

Once again, in the event that the motor means 10 is at its stall torque, it must start in the correct direction. In the event that it reverses direction, it is immediately unloaded by the member 30 disengaging the projections 35, 36, 37, and 38. This allows the control circuitry for the motor means 10 to insure that the motor means 10 again starts in the correct direction. The momentum of this arrangement typically is sufficient to insure starting in the correct direction. In no event, can the motor means 10 start and run in an incorrect direction.

Figure 5:
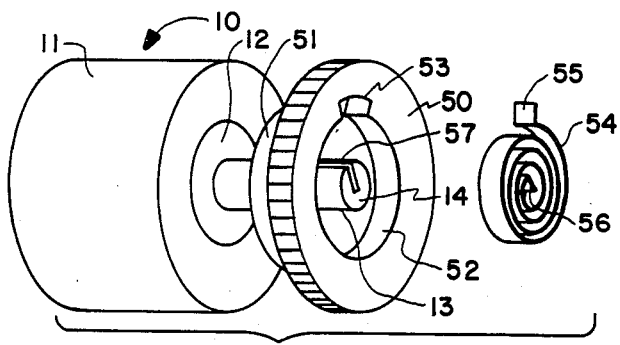
FIG. 5 is an exploded view of still a further modification of FIG. 1.
Figure 6:
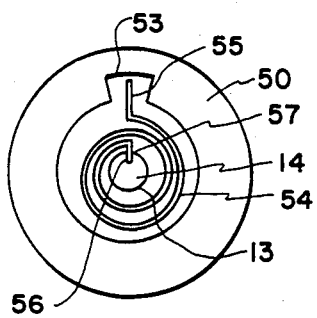
FIG. 6 is and end view of FIG. 5.

In FIGS. 5 and 6 a further configuration of a motor 10 having a stator 11 and rotor 12 is disclosed. An output shaft 13 is again provided as is an output gear means 50. The output gear means 50 has a collar 51 that has a central opening (not shown) that permits the shaft 13 to mount the gear means 50 in a loose rotational manner. Once again a means (not shown) is provide to keep the gear means 50 from moving off of the shaft means 13.

The output gear means 50 has a central opening 52 and a recess 53. Placed in the central opening 52 is a spiral-like element 54 that has a projection 55 that falls within the recess 53. A further projection 56 is inserted in a slot 57 that has been provided in the output shaft means 13. This arrangement again can be seen in an end view in FIG. 6.

As the motor means 10 is energized and caused the output shaft 13 to rotate, the spiral-like member 54 is either would tightly or unwound to expand. In either case the member becomes rigid within the center opening 52 and brings the pinion gear 50 into rotational agreement with the direction of rotation of the output shaft means 13.

Again, since the connection between the ouput shaft means 13 and the output gear means 50 is a rotational restraint means (made up in part of the spiral-like member 54 and the center opening 52) the motor and gear configuration must always start in the desired direction or allow for unloading. The unloading again allows for restarting the motor in the correct direction with some degree of momentum thereby improving the starting characteristics. In any case, the motor means 10 can not start in a direction that has not been called for by the circuit to which it is connected.

In FIG. 7 is a circuit diagram of a typical motor such as a Modutrol Motor as sold by Honeywell Inc. This motor is commonly referred to as the M644. A pair of motor windings 60 and 61 are connected at a common connection point 62 that can be brought out to an external terminal 63. Connected across the windings 60 and 61 is a capacitor 64 that has common connections at 65 and 66. The common connection 65 is brought out to a terminal 67, while the common connection 66 is brought out to a terminal 68. A pair of limit switches 70 and 71 are provided to insure that the equipment connected to this motor does not operate beyond a desired point.

In the circuit of FIG. 7 a stepdown transformer is disclosed at 72 to provide for low voltage operation. A primary winding 73 is normally connected to a line voltage source, while the stepdown or secondary winding 74 provides a 24 volt energizing potential between a terminal 75 and the terminal 63 for the common connection point 62 of the motor.

Control means 76 is shown for the motor means 10 and includes a switch 77 that has a common terminal 80 that is connected to the terminal 75. The operation of the switch 77 to connect the common terminal 80 to the terminal 67 will start the motor means 10 in a first direction, while the operation of the switch 77 to the terminal 68 will cause the motor means 10 to operate in the reverse direction thereby providing both clockwise and counterclockwise operation by a simple control means 76.

The type of motor disclosed in FIG. 7 and identified as a Modultrol Motor as manufactured by Honeywell Inc. typically is used to operate valves and dampers in heating and ventilating systems. This motor is normally sized so that its stall torque is just greater than the load to which the motor is applied. In that case, the rotational restraint means disclosed in FIGS. 1, 3, and 5 are necessary to obtain reliable directional rotation of the motor means 10 to insure that the damper or valve operates in a proper manner.

The applicants have disclosed a series of three different types of configurations which are capable of implementing the present invention. Numerous other coupling configurations are possible, and the applicants wish to be limited in the scope of their invention solely by the scope of the appended claims.

The embodiments of the invention in which an exclusive property or right is claimed are defined as follows:

1. A bi-directional, alternating current motor, including: permanent magnet rotor means for said motor; stator means having a pair of windings with each winding having a first end connected to a common external connection point; a capacitor having two end connections; each of said windings having a second end with said second ends connected to said capacitor end connections to form a delta connection configuration of said capacitor and said two motor windings; each of said end connections connected to further external connection points; control means for connection of said common external connection point and a first of said further external connection points to a source of alternating current potential to energize said motor to cause said rotor means to rotate in a clockwise direction; said control means for further connection of said common external connection point and a second of said further external connection points to said source of alternating current potential to energize said motor to cause said rotor means to rotate in a counterclockwise direction; said rotor marns having output shaft means; output gear means rotatably mounted on said output shaft means; rotational restraint means coupling together said output shaft means and said output gear means with said rotational restraint means allowing a limited amount of rotational freedom both clockwise and counterclockwise between said output shaft means and said output gear means; said rotational restraint means includes coupling means mounted to said output shaft means and which rotates with said shaft means; said output gear means engaging said coupling means upon a limited amount of rotation of said output shaft means to then in turn cause said output gear means to rotate with said rotor means; said coupling means mounted to said output shaft means being a flexible member; said output gear means includes slot means to engage said flexible member; and said flexible member being a flat key-like member projecting equally on each side of a center of rotation for said rotor means.

2. A motor as claimed in claim 1 wherein said slot means is made up of a plurality of pairs of space projections; said pairs of projections attached to said output gear means and positioned to engage said flexible member when said rotor means is caused to rotate.

3. A bi-directional electric motor, including: permanent magnet rotor means for said motor; stator means having electrical windings and including external connection points; control means for connection of said windings to a source of electrical potential to selectively cause said rotor means to rotate in a clockwise or in a counterclockwise direction; said rotor means having output shaft means; output gear means rotatably mounted on said output shaft means; rotational restraint means coupling together said output sahft means and said output gear means with said rotational restraint means allowing a limited amount of rotational freedom both clockwise and counterclockwise between said output shaft means and said output gear means; said rotational restraint means includes coupling means mounted to said output shaft means and which rotates with said shaft means; said output gear means engaging said coupling means upon a limited amount of rotation of said output shaft means to then in turn cause said output gear means to rotate with said rotor means; said coupling means mounted to said output shaft means is a flexible member; said output gear means includes slot means to engage said flexible member; and said flexible member being a flat key-like member projecting equally on each side of a center of rotation for said rotor means.

4. A motor as claimed in claim 3 wherein said slot means is made up of a plurality of pairs of space projections; said pairs of projections attached to said output gear means and positioned to engage said flexible member when said rotor means is caused to rotate.

* * * * *